United States Patent [19]

Foster

[11] 4,028,545

[45] June 7, 1977

[54] METHOD OF SIMULATING SPHERICAL VOIDS FOR USE AS A RADIOGRAPHIC STANDARD

[75] Inventor: Billy E. Foster, Oak Ridge, Tenn.

[73] Assignee: The United States of America as represented by the United States Energy Research and Development Administration, Washington, D.C.

[22] Filed: Feb. 17, 1976

[21] Appl. No.: 658,806

[52] U.S. Cl. .............................................. 250/252

[51] Int. Cl.$^2$ ........................................ G01D 18/00

[58] Field of Search ............... 250/252, 358 R, 359, 250/360

[56] References Cited

UNITED STATES PATENTS 3,183,354 5/1965 Amrehn ......................... 250/252 X 3,911,271 10/1975 Mitchell ........................... 250/252

*Primary Examiner*—Davis L. Willis

*Attorney, Agent, or Firm*—Dean E. Carlson; David S. Zachry; Louis M. Deckelmann

[57] ABSTRACT

A method of simulating small spherical voids in metal is provided. The method entails drilling or etching a hemispherical depression of the desired diameter in each of two sections of metal, the sections being flat plates or different diameter cylinders. A carbon bead is placed in one of the hemispherical voids and is used as a guide to align the second hemispherical void with that in the other plate. The plates are then bonded together with epoxy, tape or similar material and the two aligned hemispheres form a sphere within the material; thus a void of a known size has been created. This type of void can be used to simulate a pore in the development of radiographic techniques of actual voids (porosity) in welds and serve as a radiographic standard.

2 Claims, 2 Drawing Figures

METHOD OF SIMULATING SPHERICAL VOIDS FOR USE AS A RADIOGRAPHIC STANDARD

BACKGROUND OF THE INVENTION

This invention was made in the course of, or under, a contract with the Energy Research and Development Administration.

One of the problems that can occur when two pieces of material are welded together is the formation of small voids or pores in the weld joint. These voids can be detected through the use of radiographic techniques; however, to accurately determine their size, metallographic sectioning and measurement with a microscope is required, thus destroying the sample. As can be seen in FIG. 2 of the drawings, the size of the image of a void on X-ray sensitive film C is dependent on the proportional distances of the void between the film and the X-ray source. Sphere A and sphere B are identical in size; however, sphere A appears to be larger than sphere B on the radiographic images of the plate.

Thus, a need exists to provide a means of measuring voids in welds which (1) does not require destroying the weld, and (2) is sufficiently accurate to use as a standard in quality control operations. The present invention was conceived to meet this need in a manner to be described hereinbelow.

SUMMARY OF THE INVENTION

It is the object of the present invention to provide an improved method for simulating voids for use as a radiographic standard.

The above object has been accomplished in the present invention comprising a method of providing a radiographic standard for weld voids comprising the steps of drilling or etching identical hemispheres in each of two plates of welding material, placing a carbon bead of a desired size in one of the plate hemispheres and aligning the other plate hemisphere on the bead, bonding the plates to encase the bead, and radiographing the bead using various proportional distances between the bead and an X-ray film, whereby the resulting radiographs serve as standards for use in quality control comparisons of voids in actual welds.

DESCRIPTION OF THE PREFERRED EMBODIMENT

Figure 1:
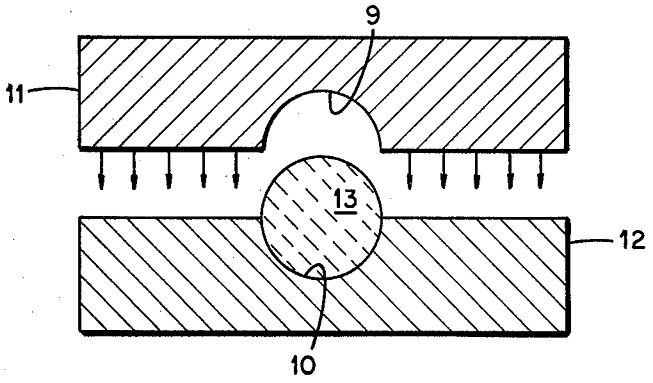
FIG. 1 illustrates the method by which spherical voids are made for use as a radiographic standard.
Figure 2:
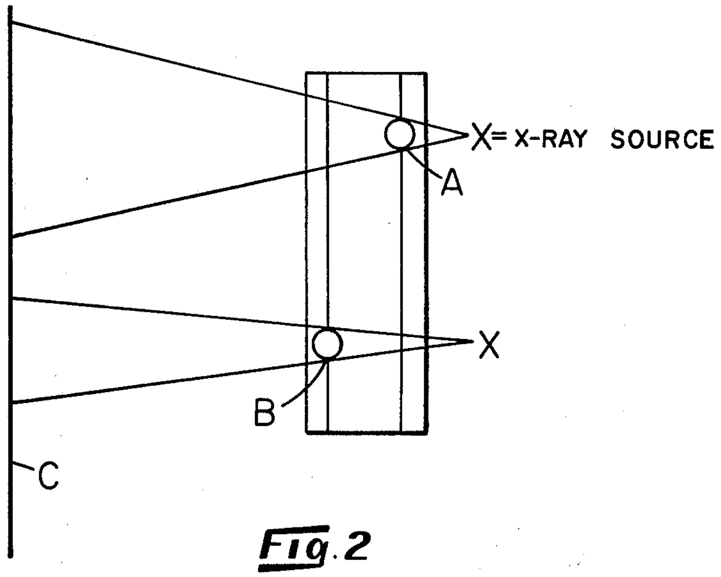
FIG. 2 illustrates the possible variation in radiographs of the same pore size at different depths in a weld.

The structure illustrated in FIG. 1 of the drawings is utilized in conjunction with radiographs thereof to provide standards for comparisons of voids in actual welds. In FIG. 1, a plate 11 of welding material has a hemisphere 9 etched or drilled therein, and a plate 12 of welding material has a corresponding hemisphere 10 etched or drilled therein. After a carbon bead 13, or other spherical material of low atomic number, is placed in one of the plate hemispheres, the other plate hemisphere is aligned on the carbon bead when the plates 11 and 12 are brought together, after which the plates are bonded together thus encasing the bead 13. It should be understood that various units, such as illustrated in FIG. 1, with different positions for the drilled or etched hemispheres, or with more than one simulated void such as illustrated in FIG. 2, are utilized in providing a variety of simulated radiographic standards for subsequent comparisons of voids in actual welds.

Thus, radiographs of the bead, or beads, can then be made using various proportional distances between the bead, or beads, and the X-ray film, and standards can then be developed to use for quality control comparisons of voids in actual welds.

The present invention can be used to develop standards for most types of weld joints, forgings, or castings by using similar techniques. In one example, the present invention can be utilized to evaluate transition (e.g., tube-to-header) weld joints; some typical materials that are used to form transition weld joints are Incoloy 800, 316 stainless steel, and 2¼ chromium-1 molybdenum.

Carbon beads have been found to be highly satisfactory for alignment purposes because they can be produced in a variety of spherical sizes and because they attenuate the X-ray beam a negligible amount in comparison to that of the thicker and denser metal.

The size of the void to be simulated could vary with the material thickness or particular application, but may be as small as 0.001–0.002 inches. Thus, as pointed out above, a series of radiographs can be made with a sphere of a particular size located at various depths in the welding material. Also, spherical voids of differing sizes can be placed in the material at various depths and radiographed. These radiographs can then be used to standarize the minimum detectable radiographic void size in various locations for future classification of voids in actual welds.

This invention has been described by way of illustration rather than by limitation and it should be apparent that it is equally applicable in fields other than those described.

What is claimed is:

1. A method of providing radiographic standards for weld voids comprising the step of radiographing a bead of low atomic number material of a desired size which bead is encased in etched, identical, opposing hemispheres of two plates of welding material bonded together, said bead being at a first given distance from an X-ray film, and repeating the above step a plurality of respective times using various other proportional distances between the bead and other X-ray films, whereby the resulting radiographs serve as standards for use in quality control comparisons of voids in actual welds.

2. The method set forth in claim 1, wherein said bead is fabricated from carbon.

* * * * *